US007627735B2

(12) United States Patent
Espasa et al.

(10) Patent No.: US 7,627,735 B2
(45) Date of Patent: Dec. 1, 2009

(54) IMPLEMENTING VECTOR MEMORY OPERATIONS

(75) Inventors: Roger Espasa, Barcelona (ES); Joel Emer, Acton, MA (US); Geoff Lowney, Concord, MA (US); Roger Gramunt, Molins De Rei (ES); Santiago Galan, Molins De Rei (ES); Toni Juan, Barcelona (ES); Jesus Corbal, Barcelona (ES); Federico Ardanaz, Barcelona (ES); Isaac Hernandez, Castelldefels (ES)

(73) Assignee: Intel Corporation, Santa Clara, CA (US)

( * ) Notice: Subject to any disclaimer, the term of this patent is extended or adjusted under 35 U.S.C. 154(b) by 261 days.

(21) Appl. No.: 11/255,676

(22) Filed: Oct. 21, 2005

(65) Prior Publication Data

US 2007/0094477 A1    Apr. 26, 2007

(51) Int. Cl.
*G06F 15/16* (2006.01)

(52) U.S. Cl. ............................................. 712/7; 712/24

(58) Field of Classification Search ........................ None
See application file for complete search history.

(56) References Cited

U.S. PATENT DOCUMENTS

| 5,184,320 | A  | * | 2/1993 | Dye ............................ 365/49 |
| 6,336,168 | B1 | * | 1/2002 | Frederick et al. ............ 711/141 |
| 2004/0064670 | A1 | * | 4/2004 | Lancaster et al. ........... 711/202 |
| 2006/0095717 | A1 | * | 5/2006 | Glossner et al. ............... 712/24 |

OTHER PUBLICATIONS

"Tarantula: A Vector Extension to the Alpha Architecture" Espasa, et al. ACM SIGARCH Computer Architecture News. vol. 30, Issue 2. Session 8: Vector architecture. pp. 281-292. May 2002.

* cited by examiner

*Primary Examiner*—Matt Kim
*Assistant Examiner*—Kaushikkumar Patel
(74) *Attorney, Agent, or Firm*—Trop, Pruner & Hu, P.C.

(57) ABSTRACT

In one embodiment, the present invention includes an apparatus having a register file to store vector data, an address generator coupled to the register file to generate addresses for a vector memory operation, and a controller to generate an output slice from one or more slices each including multiple addresses, where the output slice includes addresses each corresponding to a separately addressable portion of a memory. Other embodiments are described and claimed.

28 Claims, 10 Drawing Sheets

IMPLEMENTING VECTOR MEMORY OPERATIONS

BACKGROUND

Embodiments of the present invention relate to data processing and more particularly to processing vector operations, such as vector memory operations.

Certain processors such as microprocessors are configured to operate on different types of data. Some processors include support for operations on vector data. Such vector data is typically of a wider length than scalar operands. For example, vector data may be formed of a plurality of vector elements, each corresponding to a scalar operand. Various instruction set architectures (ISAs) include support for certain vector operations. In some instruction sets, there are instructions aimed to perform arbitrary-strided and non-strided vector memory accesses. These instructions are commonly referred to as gather (load or memory read) and scatter (store or memory write) instructions. In a gather/scatter instruction, a user provides a set of arbitrary addresses or offsets. Gather and scatter instructions are fundamental tools for a programmer and a vector compiler to produce efficient vector code that deals with one or more levels of memory indirections.

Accordingly, most vector instruction sets offer a flavor of memory access that allows reading or writing a collection of arbitrary memory locations. Typical gather/scatter instructions in a vector ISA are of the form:

Gather [v1]→v2; and

Scatter v1→[v2]

where v1 and v2 are vector registers, each of which includes a plurality of base registers. In a gather instruction, the data contained in the source register v1 is used as a set of memory addresses. For each address, a processor capable of executing the instruction would fetch the corresponding data located in memory at the specified address and place it in the corresponding position in the destination register v2.

Scatter instructions perform the reverse operation, where the source register v1 contains arbitrary data and the destination register v2 contains a set of memory addresses. Each data element in v1 is stored in memory at the location indicated by the corresponding address in v2. Some vector instruction sets have a global register that is added to the described addresses to construct a final memory address.

There are two fundamental strategies to implement gather/scatter instructions in hardware. In a first strategy, hardware generates each address in the gather/scatter in sequence and dispatches the memory requests (either reads or writes) in sequence. Such a strategy is somewhat cumbersome and ineffective, and reduces the efficiency of vector operations which seek to perform a single instruction on multiple data simultaneously. A second strategy seeks to perform multiple simultaneous accesses to a closest memory element (e.g., a cache).

However in performing the simultaneous accesses, conflicts between the data elements and portions of the memory hierarchy are to be avoided. That is, when sending multiple vector elements out to a cache memory, a portion of the cache memory can only receive a single data element during a cycle. Accordingly, various control schemes are used to avoid such conflicts. These resolution mechanisms however are relatively inefficient and are not optimized for either the specific data nor the memory elements. Accordingly a need exists for improved implementation of vector operations and more specifically vector memory operations.

DETAILED DESCRIPTION

Embodiments may be used to implement arbitrary-strided and non-strided vector memory operations using a segmented memory structure such as a banked cache. These operations may be useful for optimizing a wide range of software, particularly cryptography, graphics and media applications. Providing a high-bandwidth for these memory operations improves performance on any vector machine implementation.

Logic within an address generation unit or independent logic may be used to detect address conflicts such as pairs or groups of addresses that map to the same cache memory or memory bank and therefore cannot be dispatched in parallel. Different conflict detection mechanisms may be employed. For example, a direct all-to-all address comparison, or a content-addressable-memory (CAM) may be used to detect matches. If a conflict occurs, the conflicting requests may be stalled or buffered until a later cycle where the access becomes possible.

In various embodiments, one or more schemes may be implemented to perform vector memory operations with high efficiency and avoidance of conflicts. Some implementations may minimize conflict detection logic by accepting an indication via an instruction that the corresponding memory operation (e.g., a scatter or gather) does not conflict with prior memory operations or that the operation does not cause conflicts within a segmented register file or memory. In other embodiments, minimal conflict detection logic may be used to ensure conflict-free memory operations with reduced overhead and power consumption.

Figure 1:
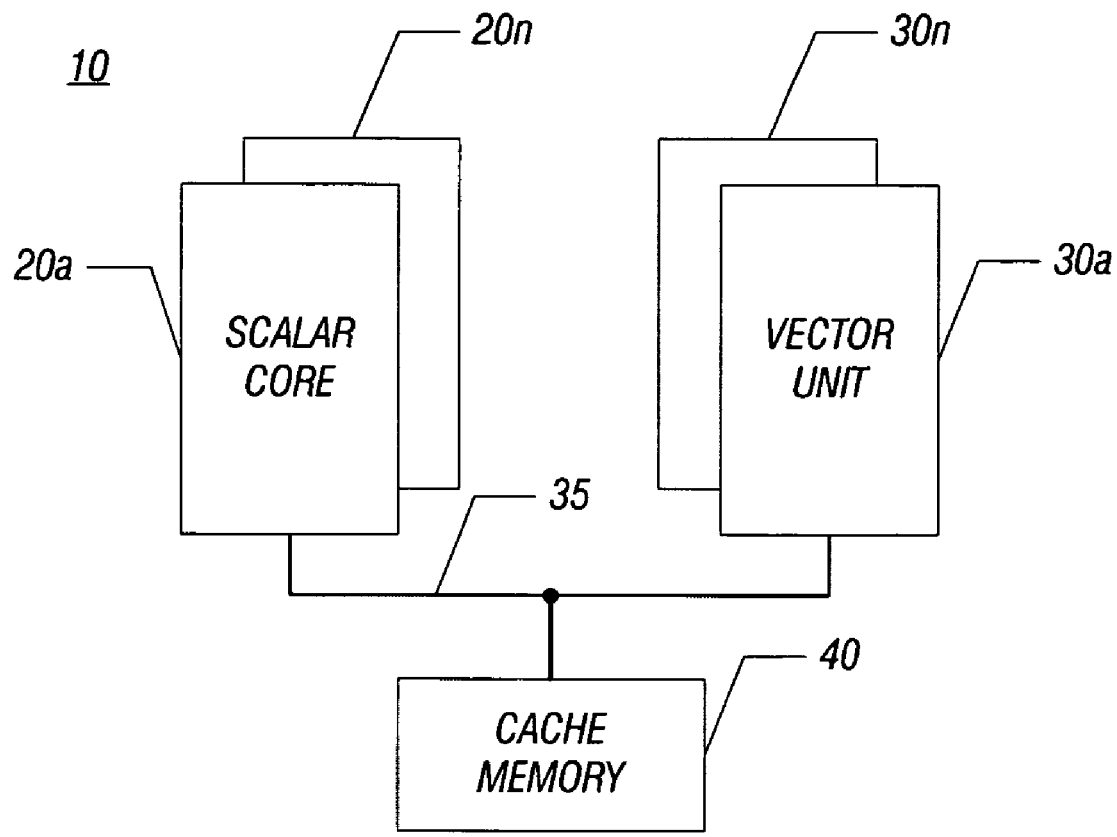
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-core processor including support for vector operations. Specifically, as shown in FIG. 1, processor 10 includes a scalar portion formed of a plurality of scalar cores $20_a$-$20_n$ (generically scalar core 20). Furthermore, processor 10 includes one or more vector units $30_a$-$30_n$ (generically vector unit 30). While shown at a high level in FIG. 1, it is to be understood that each scalar core 20 and vector unit 30 may include various components of a processor pipeline to perform instructions of an ISA. While shown with this implementation in the embodiment of FIG. 1, other manners of providing support for vector instructions are possible. For example, instead of a separate vector unit, a data path of one or more scalar cores may be extended to handle the wider width of vector operations, or a slave data path to handle extended width operands may be added to a scalar data path. Furthermore, one or more additional execution units may be included to support such vector instructions.

Still referring to FIG. 1, scalar cores 20 and vector units 30 are coupled to a cache memory 40 via an interconnection 35. In various embodiments, interconnection 35 may be a bus or other interconnect, such as a crossbar or other interconnection incorporating logic to handle distribution of vector data as described herein. In various embodiments, components of at least vector units 30 may be segmented such that multiple operations may be performed simultaneously on different vector data elements. To that end, cache memory 40 may be a banked cache or other segmented memory structure that includes multiple individually addressable portions, each able to receive or transmit data in a single cycle. While shown with this high-level view in FIG. 1, additional structures and components may be included in a processor in accordance with other embodiments of the present invention.

Figure 2:
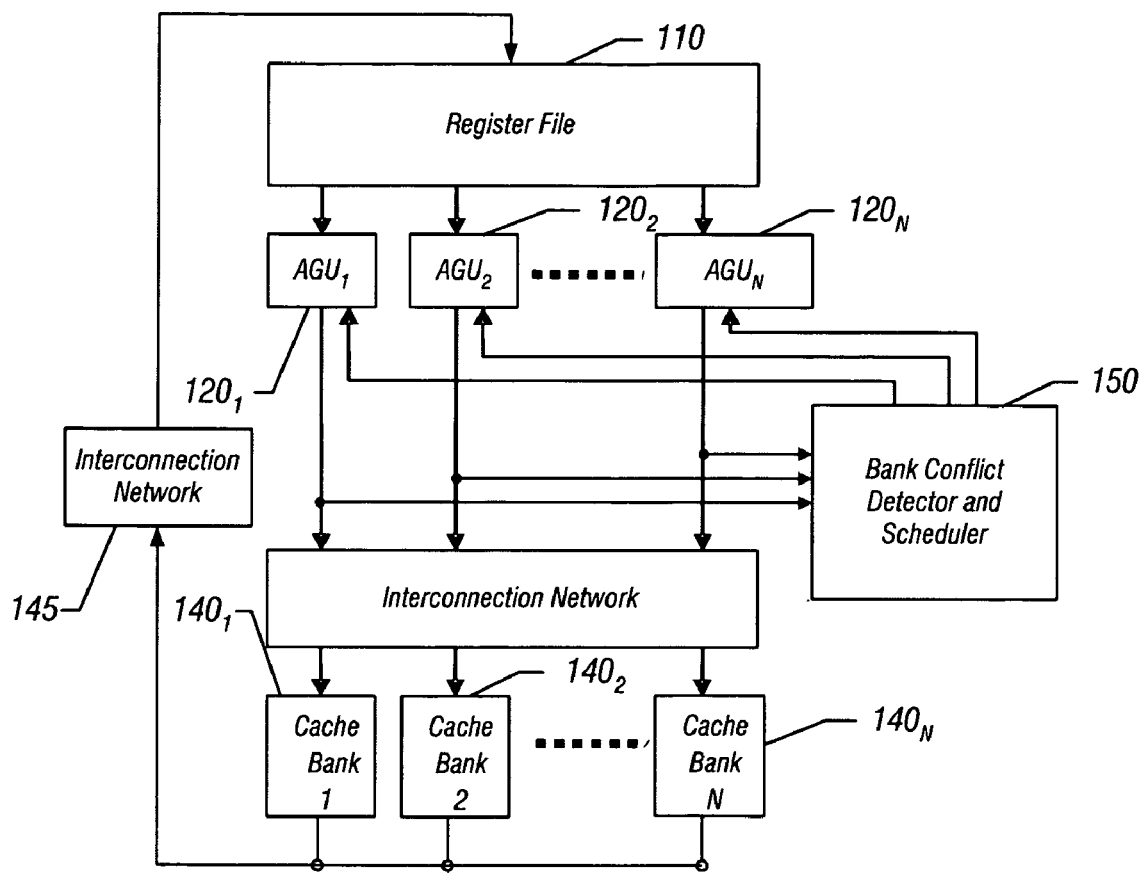
FIG. 2 is a block diagram of a portion of a data path of a processor in accordance with an embodiment of the present invention.

Referring now to FIG. 2, shown is a block diagram of a portion of a data path of a processor in accordance with one embodiment of the present invention. As shown in FIG. 2, processor 100 includes a register file 110. Register file 110 may include support for vector registers. Such registers may take different forms. For example, the vector registers may be wider than the normal data path of the processor, e.g., 256 bits or more, although the scope of the present invention is not so limited. In certain embodiments, each vector register may include a plurality of scalar elements. For example, in one implementation each vector register may be an extended length register that includes storage for, e.g., 128 scalar values. Other implementations of course are possible.

For purposes of vector memory operations, register file 110 may send a plurality of addresses (e.g., N addresses) each cycle. Specifically, as shown in FIG. 2, register file 110 may be coupled to a plurality of address generation units (AGU) $120_{1-N}$ (generically AGUs 120). Each AGU 120 may be adapted to receive a memory value from register file 110 and process it accordingly. For example, AGU 120 may take an incoming register address and translate it, e.g., into a physical address or perform some other address computation.

Still referring to FIG. 2, the generated addresses in AGUs $120_1$-$120_N$ may be coupled via an interconnection network 130, such as a crossbar or other connection network to a cache memory. More specifically, as shown in FIG. 2, addresses may be coupled to a plurality of cache banks $140_1$-$140_N$ (generally cache bank 140). That is, a cache memory may be segmented into a plurality of banks, in which each bank is accessible simultaneously in a single cycle. In other words, each partition of the cache memory is individually addressable and may thus receive inputs simultaneously. As is further shown in FIG. 2, cache banks $140_1$-$140_N$ may be coupled back to register file 110 via an interconnection network 145. In such manner, data obtained from the cache memory may be provided to the register file.

Accordingly, for improved memory operations, each individual cache bank may be accessed in a single cycle. However, if multiple addresses of a single bank are provided to the bank within a single cycle, conflicts occur. Accordingly, a conflict detector and scheduler 150 (referred to herein as "conflict detector 150") may be provided. Conflict detector 150 may be used to determine whether addresses generated in AGUs $120_{1-N}$ are conflict-free. If not, conflict detector 150 may send a feedback signal to the appropriate AGU to stall and wait for a subsequent cycle to dispatch a memory operation. Other manners of handling such conflicts are described below.

Thus FIG. 2 shows an N-way data path from register file 110 to a cache memory 140, e.g., a first available cache level. While shown in the implementation of FIG. 2 as including N cache banks and corresponding N AGUs, it is to be understood that the scope of the present invention is not so limited. As will be discussed further below, in some implementations a register file may be partitioned into a plurality of different segments referred to as lanes. For example, a register file may include as many lanes as there are banks of a corresponding cache memory (e.g., a register file may include L lanes, where L=N), although the scope of the present invention is not so limited. While not shown in the implementation of FIG. 2, additional logic to improve efficiency of memory operations, for example, by combining multiple memory operations in a single cycle may be present.

In various embodiments, conflict detector 150 may include a full conflict detection logic, as well as a streamlined conflict detection logic, as will be described further below.

In many implementations, register file 110 may have at least one read/write port for each lane and cache memory 140 may have at least one read/write port for each bank and in some embodiments two read/write ports may be present. Register file 110 may be a clustered vector register file where all the clusters can be read/written independently, and where all the elements of a single vector register are uniformly distributed (typically in round-robin fashion). With this configuration, L register elements can be read and N lines in the memory banks can be written in a single cycle as long as they belong to different lanes and banks. In one embodiment, each vector element is physically mapped into a lane depending on its position in the vector, and each memory address is physically mapped into a bank depending on a subset of bits of the address. Addresses for a vector operation, e.g., a scatter or gather, may be provided by a user and are read from register file 110. As described above, the addresses may be processed in AGUs $120_{1-N}$ and provided to conflict detector 150. In some embodiments, slices may be generated within conflict detector 150. A slice may correspond to a plurality of memory addresses provided to a memory structure, e.g., a cache, in a single cycle without conflict. Each slice ought to be composed of B buckets; each bucket can hold one address plus a valid bit. Each address in a slice ought to originate from a different lane in register file 110. Slices that fulfill this condition may be referred to herein as "Lane Conflict Free" (LCF) slices. Accordingly, all the addresses of a LCF slice can be read in a single cycle.

Conflict detector 150 may process slices and produce new slices to accomplish two constraints: (1) maintain the slices as LCF; and (2) ensure that the slices are "Bank Conflict Free" (BCF). In other words, each address of a slice is mapped to a different cache bank and to a different register file lane. In many implementations, conflict detector 150 may process slices in a sequential manner, while searching for opportunities to minimize the number of iterations. In order to do so, conflict detector 150 may combine addresses coming from different input slices into the same output slice. The addresses presented to conflict detector 150 may be either logical or physical, in different implementations.

Figure 3:
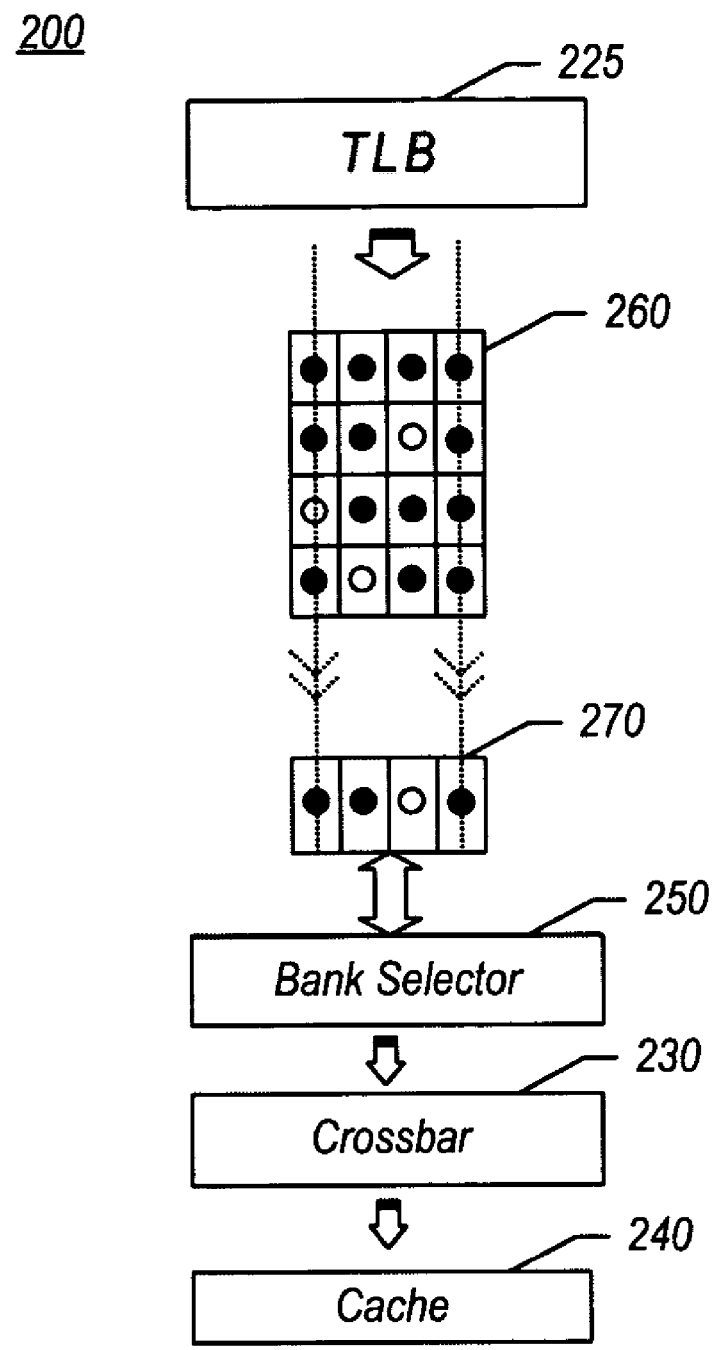
FIG. 3 is a block diagram of a portion of a data path of a processor in accordance with another embodiment of the present invention.

In certain implementations a translation lookaside buffer (TLB) may be coupled to address generation units to convert a logical address into a physical address for use in accessing a memory hierarchy. Referring now to FIG. 3, shown is a block diagram of a portion of a data path of a processor in accordance with another embodiment of the present invention. As shown in FIG. 3, processor 200 may include a TLB 225. While shown as a single TLB, it is to be understood that in certain implementations, a plurality of such buffers may be present, one for each corresponding AGU (not shown in FIG. 3) to which TLB 225 is coupled to receive addresses. As discussed above, TLB 225 may translate incoming addresses into physical addresses. These physical addresses may be provided to a buffer 260, referred to herein as a slice queue. Slice queue 260 may buffer the TLB-translated addresses, which may be sent by TLB 225 as individual slices, each including a plurality of memory addresses. Thus, initially the slices are buffered in arrival order in slice queue 260.

Still referring to FIG. 3, a refilling latch 270 is coupled to slice queue 260 While shown separately from slice queue 260 in FIG. 3, refilling latch 270 may be part of slice queue 260, in certain implementations. Refilling latch 270 may be used by a bank selector 250, which may be conflict resolution and scheduler logic, to form a conflict-free slice from the stored input slices. The conflict-free slice thus extracted by bank selector 250 from refilling latch 270 may be coupled through a crossbar 230 or other interconnection network (if present) and to a cache memory 240, which may be a banked cache including N banks. Of course, while shown with this implementation in the embodiment of FIG. 3, it is to be understood that the scope of the present invention is not so limited and other manners of generating conflict-free slices may be present in other embodiments. Furthermore, while described in this implementation as using a TLB, in other embodiments untranslated addresses may be similarly processed.

Figure 4:
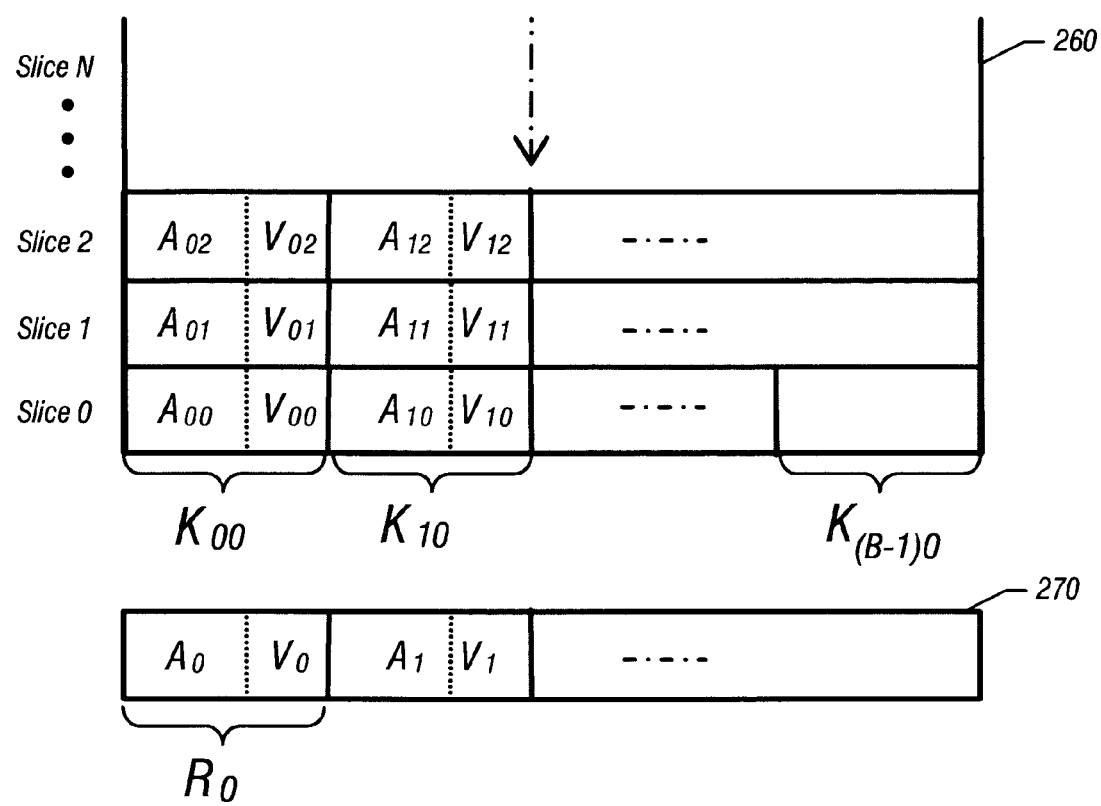
FIG. 4 is a block diagram of a slice buffer in accordance with one embodiment of the present invention.

FIG. 4 shows the details of a slice buffer and corresponding refill latch in accordance with one embodiment. To refer to a particular address in slice buffer 260 a notation Aij used in FIG. 4, where i represents a bucket position (where a bucket corresponds to a single address, e.g., of a single bank of memory) in the slice and j represents the slice position in the queue. Note that in some implementations, only the bits for each address that determine the bank may be stored. In addition to an address, each bucket may include one or more status indicators, such as a valid bit (i.e., V), where the valid bit (when reset) is used to mark an empty bucket (i.e., non-valid address or an already processed address). Refilling latch 270 thus may be a temporal refilling latch to combine enqueued slices. Refilling latch 270 may also include B buckets with their addresses and valid bits.

During each cycle, slice queue 260 is scanned looking for valid bits in a first phase. In one example, the oldest (queue order) valid address for each bucket is selected and is copied into refilling latch 270 if its corresponding bucket position is empty. For the $x^{th}$ refilling latch bucket Rx, only addresses in the same bucket position (i.e., $K_x$) may be used to (re)fill it. In other words, Rx can contain any Kij with i=x. Given that ordering, slices generated in refilling latch 270 preserve the LCF condition.

Referring back to FIG. 3, in a second phase of a cycle, bank selector 250 reads refilling latch 270 and chooses a subset of the buckets in which the valid bit is set and the address banks are different. The valid bits for the selected addresses are cleared to prevent their use more than once. Since refilling latch 270 includes an LCF slice, the output slice accomplishes both LCF and BCF constraints. The set valid bits are shown in solids and reset valid bits are shown as hollow, in FIG. 3.

The selection logic of bank selector 250 is thus inherently sequential, since once an address is selected, no other address using the same bank can be used in the same slice. Accordingly, the algorithm makes an in-order selection according to the bucket position. First, the address in bucket zero is selected (unless its valid bit is off) and its bank is marked as used, then the address in bucket one is selected (unless its valid bit off or its bank is marked as already used). This process is repeated for all the remaining buckets in refilling latch 270. In some embodiments, starting the reading process in a different bucket of refilling latch 270 each cycle may improve the efficiency of the algorithm and hence increase the number of valid addresses in the outgoing slices. Accordingly, at each cycle the initial bucket may be incremented (with wrapping around), regardless of the state of slice buffer 260.

Note that the output slice from refilling latch 270 obeys both the LCF and BCF conditions. However, there are no guarantees that an address for a given bank B will be located in any particular bucket. Therefore, crossbar 230 may be used to route each address to the corresponding bank in the cache 240. Since the addresses are BCF for a given slice, the cache can process all slice addresses in parallel. In the case of a gather, the data sent back by cache 240 may be written into a register file, and assuming the cache system does not mix up elements of different slices, breaking the LCF property, all the data can be written back in a single cycle. Again, a crossbar may be used to route each piece of data to a corresponding lane of the register file. The data for a scatter may also be read from the register file in a single cycle given the LCF condition.

Depending on memory ordering requirements of the system, slices coming from different instructions may be processed together (i.e., mixed in the output slices) or not. At the same time, if atomicity is required for the operation (for example, for scatters), all the slices may be stored in slice buffer 260 before the first output slice is produced to prevent the memory subsystem from seeing a partial write. Increasing slice buffer depth may help to maximize the average throughput and minimize the latency of the system.

In certain implementations, slices may be optimized to reduce the number of slices for a memory operation while maintaining conflict-free operation. For purposes of explanation, assume a gather operation with seven addresses as set forth in Table 1 below:

TABLE 1

| Element | Address | Cache Bank |
|---------|---------|------------|
| 1 | @0000 | 0 |
| 2 | @1000 | 1 |
| 3 | @2000 | 2 |
| 4 | @1234 | 1 |
| 5 | @0002 | 0 |
| 6 | @1236 | 1 |
| 7 | @3000 | 3 |

As shown in Table 1, a plurality of vector elements are shown, each having a different address with each address destined for a particular bank of a cache memory. While described herein with respect to banks of a cache memory, it is to be understood that embodiments may be used in connection with partitioning of other memory elements, such as main memory or other such structures.

Slices are formed by a set of addresses that allow simultaneous processing. Furthermore, every address corresponds to an element of the operation. When this concept of a slice is used in a cache architecture where each bank contains a whole cache line, then every single address of the slice refers to a different cache line, and the maximum number of addresses in a slice equals the number of banks in the cache. Note that in a mono-banked cache, slices may include a single address.

Referring now to Table 2, shown is an example implementation of slices generated from the gather operation set forth in Table 1.

TABLE 2

| Slice Number | Elements | Addresses | Bank | Cache line |
|---|---|---|---|---|
| 1 | 1, 4 | @0000, @1234 | 0, 1 | 000, 123 |
| 2 | 5, 6 | @0002, @1236 | 0, 1 | 000, 123 |
| 3 | 2, 3, 7 | @1000, @2000, @3000 | 1, 2, 3 | 100, 200, 300 |

As shown in Table 2, each slice includes a number of elements having different addresses that correspond to locations in different banks which access different cache lines within the banks.

Of course, other schedulings are possible for the example gather operation, e.g., by creating a more densely packed slice containing addresses @0000, @1234, @2000, @3000. If such packing was done, then the first slice would have four addresses, while the third slice would only have a single address. Other scheduling heuristics may be implemented in different embodiments.

The number of slices generated by vector memory operations may be reduced by relaxing some conditions regarding conflict-free protocols to enable compacted slices. A compacted slice contains a set of addresses that are "almost" bank conflict free. Specifically, bank conflicts may be allowed as long as two or more conflicting addresses access the same cache line.

Using such an embodiment, the slices set forth in Table 3 may be reduced into two compressed slices as shown in Table 3:

TABLE 3

| Slice Number | Elements | Addresses | Bank | Cache line |
|---|---|---|---|---|
| 1 | 1, 4, 5, 6 | @0000, @1234, @0002, @1236 | 0, 1, 0, 1 | 000, 123, 000, 123 |
| 2 | 2, 3, 7 | @1000, @2000, @3000 | 1, 2, 3 | 100, 200, 300 |

As shown in Table 3, the first slice may include multiple elements that access the same bank because these elements access data of the same cache line within the bank. For example, elements 1 and 5 both access cache line 000 of bank 0, while elements 4 and 6 both access cache line 123 of bank 1. From the cache point of view, these compacted slices may be processed at once, just like a regular slice, since all the different lines that are to be read out of the cache will come from different banks. The only difference is that some lines will be used by more than one element in the slice.

Figure 5:
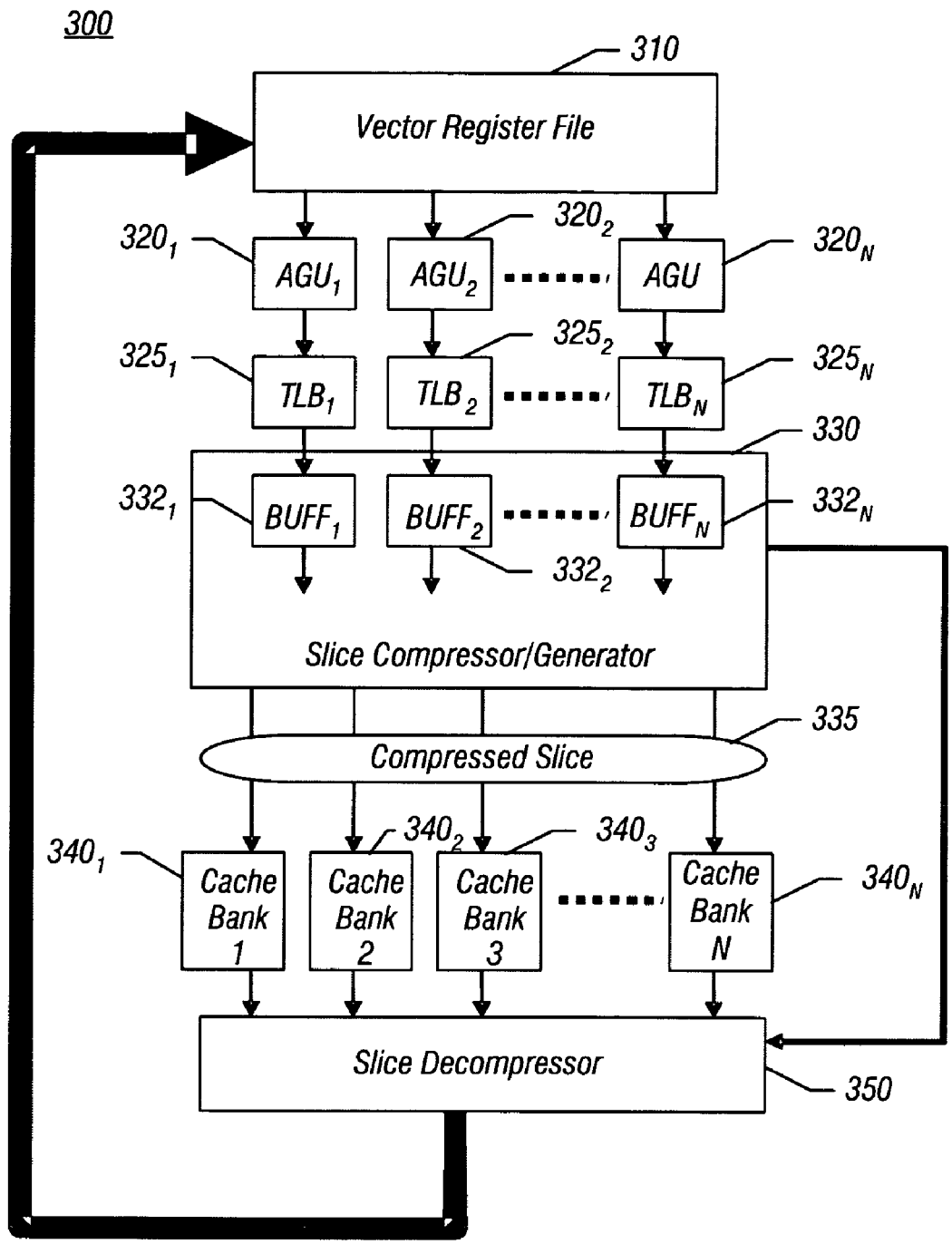
FIG. 5 is a block diagram of a data path of a processor in accordance with yet another embodiment of the present invention.

Different hardware, software and/or firmware may be used to generate and use compressed slices. As one example, a first hardware circuit may be included to generate a slice and a second hardware circuit may be used decompress the sliced data obtained from memory. Referring now to FIG. 5, shown is a block diagram of a data path of a processor in accordance with another embodiment of the present invention. As shown in FIG. 5, processor 300 may include a register file 310, which may include support for vector registers and vector operations. Coupled to register file 310 are a plurality of AGUs $320_1$-$320_N$ (generically AGUs 320). AGUs 320 may be used to generate addresses, e.g., corresponding to vector memory operations. In the implementation shown in FIG. 5, the generated addresses from AGUs 320 may be coupled to a plurality of translation lookaside buffers $325_1$-$325_N$ (generically TLB 325). TLBs 325 may be used to translate logical addresses to physical addresses.

Still referring to FIG. 5, from TLBs 325, generated addresses may be provided to a slice compressor/generator 330 (referred to herein as slice generator 330). As shown, slice generator 330 may include a plurality of buffers $332_1$-$332_N$ (generically buffers 332). These buffers may be used to store incoming addresses to improve operation. For example, in a situation where conflicts exist, the conflicting addresses may be stored in buffers 332. In such manner, stalls or other impairments to a processor pipeline may be avoided.

Slice generator 330 may implement an algorithm such as described above to generate compacted slices. For example, slices may be generated in which vector elements that access memory locations in a single cache line of a bank may be compacted into a single slice, improving efficiency while maintaining conflict-free operation.

Thus when a gather/scatter is ready to be executed, all the base addresses for its elements may be read out from register file 310 and driven through an AGU 320 and TLB 325. Then, this set of address-element couples is presented to slice generator 330. In turn, slice generator 330 may generate two kinds of information, namely a slice of bank conflict-free memory line addresses to be provided to the cache/memory, along with data describing the mapping of gather/scatter elements to the addresses of the slice, since more than one element can map to the same address in a compressed slice.

Thus slice generator 330 may generate a compressed slice 335, which is provided to a plurality of cache banks $340_1$-$340_N$ (generically cache 340). Based on the information in compressed slice 335, cache 340 is accessed, and the results are presented to a slice decompressor 350 which may also include a crossbar.

Slice decompressor 350 may receive data results from cache banks $340_1$-$340_N$ and also receive mapping information from slice generator 330. Based on the information received from slice generator 330, slice decompressor 350 may obtain the correct incoming data corresponding to the memory locations (e.g., within a cache line) of the memory operations and provide it to, e.g., register file 310 to satisfy a gather operation, for example. Thus, in case of a gather operation, decompressor 350 determines how to extract the precise data portions corresponding to elements from the cache lines read out based on the data from slice generator 330. In case of a scatter operation, decompressor 350 can determine how to modify the cache lines with the data elements. Thus in various embodiments, compacted gather/scatter slices may reduce a number of slices required for a given gather/scatter operation, along with the number of lines read/written from the cache.

Such reductions may be especially noticeable when gather/scatter are used to access elements from a small matrix that fits in few cache lines. Such a matrix is commonly found in encryption/decryption algorithms, which commonly access multiple scattered positions of various small arrays. In this way, more efficient execution of gather/scatter instructions in both terms of power and timing is effected.

Different processor types have different requirements with respect to memory ordering. For example, some processors are in-order machines in which operations occur in order. In contrast, other processors are out-of-order machines in which operations can be performed out of order to improve performance by performing useful work in every cycle. Even in out-of-order machines, however, various memory ordering requirements may exist. For example, in different machines, different requirements may exist with respect to ordering between memory write and read operations and the like. To obey ordering between different memory operations, e.g., writes and reads, a processor may detect if a memory read conflicts with any previous memory write, and may further detect if a memory write conflicts with a previous memory read/write. Given that the gather/scatter operations are composed of random sets of addresses, the conflict computation in general is a quadratic problem, and consequently, this conflict analysis may consume large investments in both area and power.

Accordingly, in some embodiments user-level instructions or opcodes may be provided to indicate to a processor that the operations corresponding to these opcodes relate to addresses that do not conflict with pending memory operations. As used herein, these opcodes may be referred to as "alias-free" gather/scatters. In one embodiment, these opcodes may be as follows:

Gather-no-conflict [v1]→v2; and

Scatter-no-conflict v1→[v2].

The semantics of the "gather-no-conflict" instruction may be like the semantics of a normal "gather" instruction, with the difference that the programmer guarantees (e.g., to hardware) that there are no dependencies in the addresses of the index vector registers (e.g., v1) and that the hardware need not check the addresses of the gather against prior memory writes. In other words, the user is guaranteeing that out-of-order execution of this gather's memory reads relative to prior instructions is legal and the hardware is free to optimize the execution of the gather instruction with respect to previous memory operations.

The semantics of the "scatter-no-conflict" instruction are like the semantics of a normal "scatter" instruction, with the difference that the programmer is telling the hardware that it need not check the addresses of this scatter against prior memory writes or prior memory reads. In other words, the user is guaranteeing that out-of-order execution of this scatter's memory writes relative to prior instructions is legal and the hardware is free to optimize the execution of the scatter instruction with respect to previous memory operations. Of course, in different processors, other restrictions on the execution of memory operations may exist relative to its memory ordering rules.

As a result, alias-free gather/scatter instructions may avoid conflict detection logic, reducing latency and also conserving energy and power by avoiding clocking of conflict detection logic. Additionally, use of such an instruction may speed up the overall execution.

Figure 6:
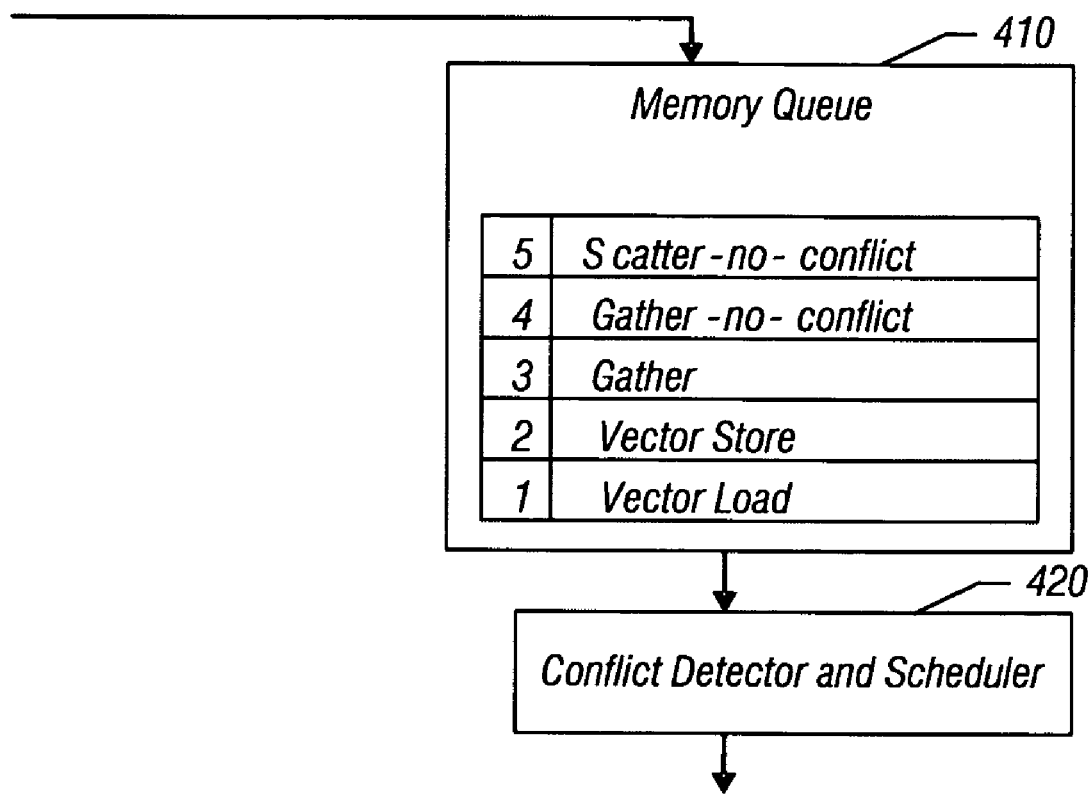
FIG. 6 is an example memory queue in accordance with an embodiment of the present invention.

Referring now to FIG. 6, shown is an example memory queue in accordance with an embodiment of the present invention. As shown in FIG. 6, a processor 400 may include a memory queue 410 that may be used to store pending memory operations in program order. As one example, memory queue 410 may be adapted to store vector memory operations, although the scope of the present invention is not so limited. As shown in FIG. 4, memory queue 410 may include a plurality of entries each corresponding to a vector memory operation. Each of these numbered entries 1-5 is shown in arrival order, with the oldest instruction enumerated as 1 (i.e., a vector load operation) and so forth.

As further shown in FIG. 6, a conflict detector and scheduler 420 (referred to herein as conflict detector 420) may be coupled to memory queue 410. As one example, conflict detector 420 may be independent memory ordering logic. However, in many implementations conflict detector 420 may further include logic to handle resolution of conflicts between memory banks and lanes of a register file, as described above. Typically, conflict detector 420 may control execution of the memory operations in memory queue 410 based on memory ordering protocols of a given processor. However, with respect to entries 4 and 5 that include alias-free memory operations, namely a gather-no-conflict operation in entry 4 and a scatter-no-conflict operation in entry 5, conflict detector 420 may order these operations prior to the earlier memory instructions.

Specifically, the gather-no-conflict instruction in entry 4 may be executed before the instructions in entries 1, 2, and 3, if conflict detector 420 so chooses. The scatter-no-conflict instruction at entry 5 may be executed before instructions in entries 3 and 4 if conflict detector 420 so chooses. Whether the scatter-no-conflict instruction may be executed before instruction in entry 2 may depend on other memory ordering rules of the architecture. Furthermore, this example assumes that write operations proceed ahead of read operations, although other implementations are possible. Accordingly, conflict detector 420 may skip memory address checking mechanisms for these gather and scatter instructions.

In yet other embodiments, additional user-level opcodes may be used to indicate that addresses enumerated in corresponding memory operations are conflict free (e.g., lane conflict free and bank conflict free), and these opcodes may be referred to as "conflict-free" gather/scatter operations. In other words, a programmer using these opcodes guarantees that the addresses contained in the index vector registers (v1 for gather example above, and v2 for scatter example above) are conflict-free. That is, within the index vector, each group of $M<=N$ addresses, N being the number of memory or cache banks supported by the cache or memory, is guaranteed to map to M different banks.

Different manners of implementing these programmer-guaranteed opcodes (e.g., alias-free or conflict-free opcodes) may be accommodated. For example, in some implementations the guarantee provided by the programmer may be accepted by the hardware and various mechanisms described herein for determining whether conflicts exist or memory ordering logic may be avoided, reducing computation complexity and power consumption. However, in other implementations limited hardware support may be provided to enable the processor to verify that these guarantees are accurate. In such manner, inaccurate operation as a result of an improper programmer guarantee can be avoided.

In one embodiment, logic may be included, e.g., in a conflict detector to check the bank index bits of an address. For example, in one implementation, an address <i> may include log 2(N) address bank bits. A test may be made to determine whether the bank address bits are equal to "i mod N". If so, the addresses in the index vector register are cyclically bank conflict free. In one embodiment, a k-bit comparator, where k=ceil(log 2(N)), may be used to implement this test, although other variants are possible. If an address in the index vector register fails the bank bits test, a trap may be generated to pass control to system software to take further action.

In another variant, a user-level opcode may guarantee that each group of N consecutive addresses in an index vector register maps to N different banks. However, the order of the addresses need not match exactly the bank order. In this case, the hardware may check that there are no two accesses to the same bank within the same group. In some embodiments, N decoders, or N N-input OR devices and a final N-input AND device may be used to perform this check.

In another embodiment, hardware may confirm the bank-conflict free property by inserting bank bits in the middle of an address in an index register. For example the upper address bits may be shifted or, alternatively, existing bank bits may be replaced. To implement this test, a bit substitution device and a shifter may be provided.

As a result, conflict-free gather/scatter instructions may avoid conflict detection logic, reducing their latency and conserving power or be run through minimal conflict detection logic.

To improve performance of other vector memory operations including strided operations, an address generator may generate as many addresses per cycle as the maximum number of banks of the memory hierarchy. In order to do so, the address generator relies on information included in a vector memory load or store instruction. Specifically a vector memory load/store may define a set of memory addresses with four different parameters: the effective address (Effa), which is the address of the first element; the vector length, which is the number of addresses; the vector stride, which is the distance in memory between two consecutive addresses of a vector; and the data size, which is the size of each individual access. Memory addresses defined by the instruction may be generated based on permutations of the received address information so that in every cycle addresses do not access the same bank; (i.e., are BCF); data related to those addresses coming/going to the vector register file do not read/write the same vector register file lane (i.e., are LCF); and sequential addresses access sequential banks (i.e., a first address accesses bank 0, a second address accesses bank 1, and so on).

Based on the information given by the vector memory instruction, a permutation of the addresses may be generated. With such permutations, in each cycle, a set of addresses may be generated that do not conflict in any memory bank and that go to sequentially-ordered memory banks while at the same time, data read/written each cycle from/to the register file cluster do not conflict.

Figure 7:
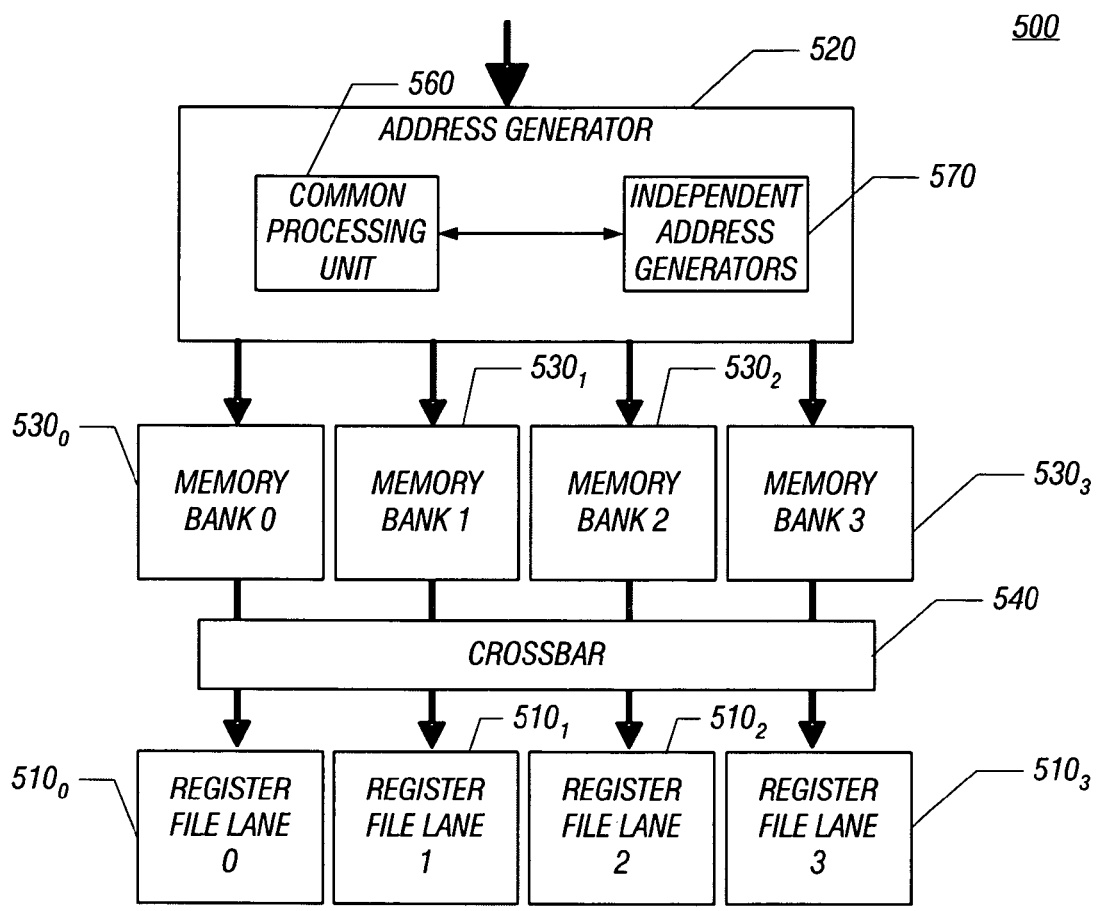
FIG. 7 is a block diagram of another implementation of data path of a processor in accordance with an embodiment of the present invention.

Referring now to FIG. 7, shown is a block diagram of another implementation of a data path of a processor in accordance with an embodiment of the present invention. As shown in FIG. 7, processor 500 includes an address generator 520. As described above, address generator 520 may receive vector memory instructions (e.g., vector memory loads and/or stores) that include information regarding effective address, vector length, vector stride, and data size. Of course, in different implementations different information may be provided with a vector memory instruction. Based on this information, address generator 520 may generate addresses to implement the memory instruction that are both BCF and LCF. In such manner, in every cycle memory operations may access different ones of memory banks $530_0$-$530_3$ (generically memory bank 530). Furthermore, data accessed in memory banks 530 may be provided through a crossbar 540 to different lanes of a register file. Specifically, as shown in FIG. 7 a register file may be formed of a plurality of register file lanes $510_0$-$510_3$ (generically register lane 510). While shown in the embodiment of FIG. 7 as including four memory banks and four register lanes, it is to be understood that the scope of the present invention is not so limited and in other embodiments additional segmentations may be provided.

Different implementations of address generator 520 may be used to provide these addresses that are both BCF and LCF.

Figure 8:
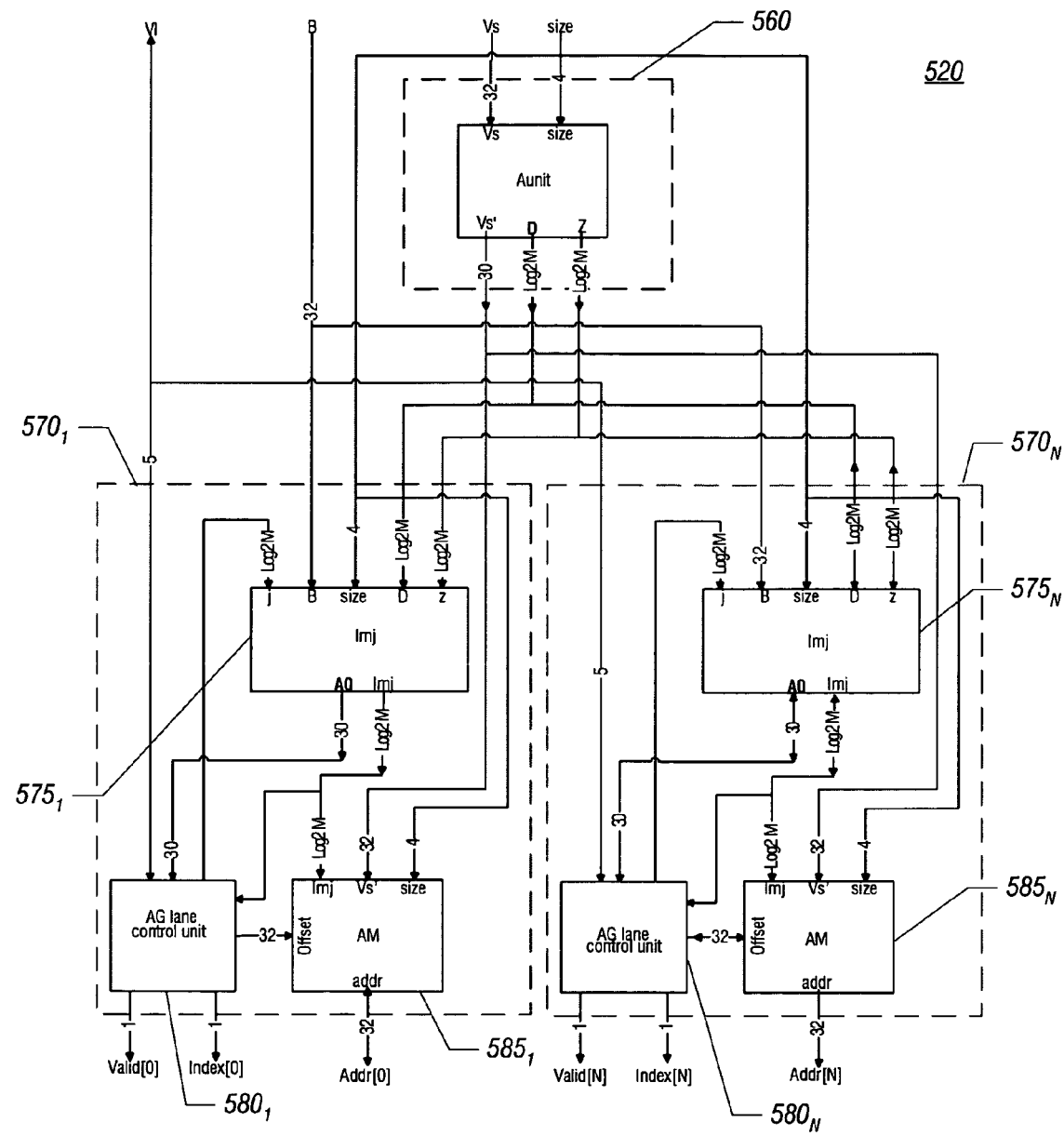
FIG. 8 is a block diagram of an address generator in accordance with one embodiment of the present invention.

Still further, the addresses provided to memory banks 530 may be provided in a sequential manner. In one embodiment, address generator 520 may include a common vector memory instruction processing unit 560 and a plurality of independent address generators 570. Referring now to FIG. 8, shown is a block diagram of an address generator in accordance with one embodiment of the present invention. As shown in FIG. 8, address generator 520 includes a common processing unit 560 and a plurality of independent address generators 570. In various embodiments there may be a single independent address generator for each memory bank.

As shown in FIG. 8, address generator 520 may include a common processing unit 560 (also referred to herein as an Aunit). Furthermore, address generator 520 includes a plurality of independent address generators $570_1$-$570_N$ (generically independent address generator 570). While shown in the embodiment of FIG. 8 as including only two such independent address generators, additional ones may be provided in different embodiments.

Common processing unit 560 may receive the vector memory instruction parameters and broadcast control information to independent address generators 570. In other embodiments, common processing unit 560 may be replicated and integrated among the independent address generators.

Each independent address generator 570 may generate addresses for one logical bank of the memory hierarchy (regardless of the number of physical banks that compose it). In each cycle, each independent address generator 570 may output an address to the bank/banks controlled by it. All address generators 570 may be initialized and operate such that in every cycle, no memory bank is accessed twice (since different address generators are in charge of different banks), and no register cluster is read/written twice. As shown in FIG. 8, each address unit includes three main blocks, namely an ordering calculator (Imj) 575 (generically); an address calculator (AM) 585 (generically); and a control unit (i.e., a lane control unit) 580 (generically).

Whenever a new vector memory instruction arrives to common processing unit 560, the vector stride and data size may be used to generate and broadcast three different parameters to each independent address generator 570. Specifically, common processing unit 560 generates a factorized stride (vs'), a stride factor (z, which is a power of two) such that the vector stride becomes vs=vs'x z, and a delta (Δ) factor which is leveraged by a table, such as a read only memory (ROM). This Δ factor describes the distance between sequential elements (taking into account the natural ordering of the vector) between two addresses located in the same bank and consecutive line positions (i.e., alignment), or in sequential banks, depending on memory interleaving.

When an independent address generator 570 receives information from common processing unit 560, control unit 580 calculates the number of addresses it is responsible for generating. Additionally, control unit 580 initializes the first address to generate to the first bank and a given position inside the bank. This process is a function of the common component information and the index of the individual address generator. This initialization grants cluster conflict-free address generation.

The initial position inside the bank may be calculated as follows, in one embodiment:

$$Pos=(addr\_generator\_index/(\#addr\_generators/ (words\_per\_bank/z)))*z+\textit{effa} \% z \qquad [Eq. 1]$$

where addr_generator_index is the index of the individual address generator, #addr_generators is the total number of generators, and words_per_bank is the number of words to be read/written to each bank.

Every cycle, each independent address generator 570 may perform the following sequence of operations. First, element ordering may be determined as a function of Pos, $\Delta$, #banks and z. Next, an address (addr) may be generated equal to the element ordering * vector stride+effa. Control unit 570 may then determine if the address so generated is valid or not.

Further, independent address generator 570 may generate an updated position corresponding to:

$$Pos = Pos + z(\text{mod}(\#\text{bank} \times \#\text{words\_per\_bank}/\#\text{address generators})) \quad [\text{Eq. 2}]$$

where #bank is the number of banks.

As a result, each address generator 570 may output the following information each cycle: an address (addr) to be used to access the associated memory bank; a valid bit indicating whether the address is valid or not; and an index to identify the ordering of the element inside the vector (which may be used to index the register file).

Thus using an embodiment such as that described above with regard to FIGS. 7 and 8, a crossbar to route addresses to appropriate banks may be avoided. Further use of additional conflict detection logic may be avoided. Accordingly vector address generator 520 may simultaneously grant bank conflict-free access and register file cluster conflict-free address. Furthermore, address generators 570 may work in independent fashion, allowing for distributed implementations. Accordingly, arbitrary strided and non-strided vector memory operations may be implemented. Since the output slices are BCF, an already existing banked cache design can be used to support vector memory operations.

Figure 9:
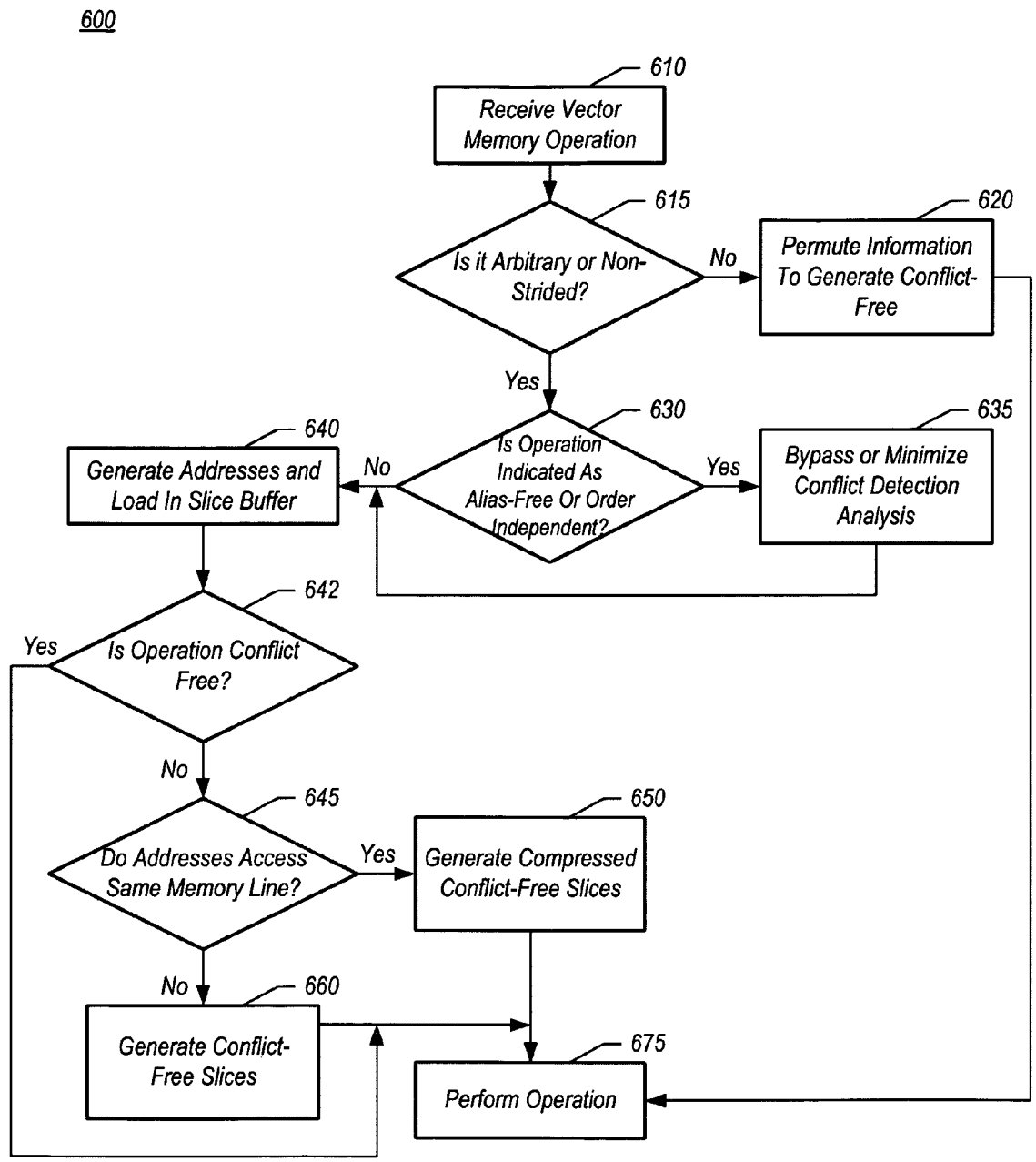
FIG. 9 is a flow diagram of a method in accordance with one embodiment of the present invention.

Referring now to FIG. 9, shown is a flow diagram of a method in accordance with one embodiment of the present invention. As shown in FIG. 9, method 600 may be used to perform vector memory operations. Method 600 may begin by receiving a vector memory operation (block 610). For example, such operation may be received from an instruction cache of a processor, where the instruction is decoded into one or more microinstructions to perform the desired operation.

Next, it may be determined whether the operation is an arbitrary or non-strided operation (diamond 615). In other words, it may be determined whether the operation is directed to a scatter/gather or other such operation in which the vector elements are at arbitrary locations, or instead the operation is, e.g., a vector load or store in which the vector elements are at some predetermined stride location or other set value from each other. If it is determined that the operation is a strided operation, control may pass to block 620. There, based upon information received with the instruction, addresses may be generated that are conflict-free (block 620). Specifically, these addresses may be generated based on permutations of the information received, such as described above with regard to FIGS. 7 and 8. After calculating the addresses, control may pass to block 675, where the operation is performed.

If instead at diamond 615 it is determined that the operation is, e.g., a scatter or gather, control passes to diamond 630. There, it may be determined whether the operation is indicated as alias-free or order independent (diamond 630). If so, control may pass to block 635. There, various conflict detection analyses such as described herein may be bypassed entirely or at least minimized (block 635). In other words, the addresses for the memory operation may be generated without regard or with limited regard to such conflict detection logic. Thus control passes to block 640, discussed below.

Still referring to FIG. 9, if instead at diamond 630 it is determined that the operation is not indicated as an alias-free or order independent operation, control passes to block 640. There, addresses may be generated and loaded into a slice buffer (block 640). Then control passes to diamond 642, where it is determined if the operation is conflict free. If so, control passes to block 675, discussed above. If the operation is not conflict free, it next may be determined whether one or more of the addresses in the slice buffer access the same memory line, e.g., a cache line (diamond 645). If so, one or more compressed conflict-free slices may be generated (block 650). Accordingly, the slices may be sent to a corresponding memory to perform the operation (block 675).

If instead at diamond 645 it is determined that addresses do not access the same memory line, control may pass to block 660. There, conflict-free slices may be generated (block 660). For example, one or more slices may be generated in accordance with the various embodiments described herein. Finally, after generating such conflict-free slices, they may be provided to the corresponding memory to perform the operation (block 675). While described with this particular implementation in the embodiment of FIG. 9, it is to be understood that the scope of the present invention is not so limited and other methods of performing vector operations may be performed.

Figure 10:
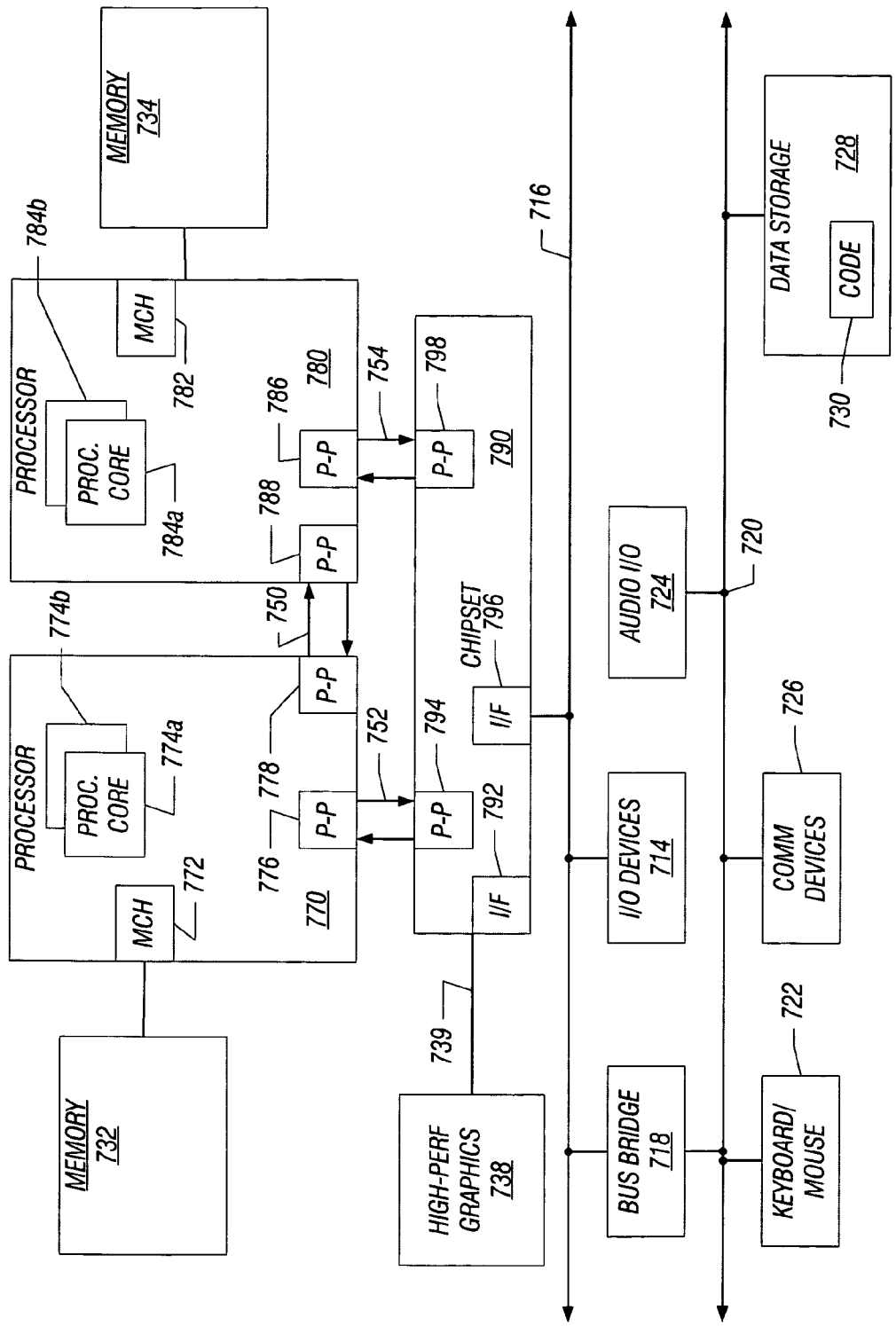
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, a point-to-point interconnect system includes a first processor 770 and a second processor 780 coupled via a point-to-point interconnect 750. As shown in FIG. 10, each of processors 770 and 780 may be multicore processors, including first and second processor cores (i.e., processor cores 774a and 774b and processor cores 784a and 784b). First processor 770 further includes a memory controller hub (MCH) 772 and point-to-point (P-P) interfaces 776 and 778. Similarly, second processor 780 includes a MCH 782 and P-P interfaces 786 and 788. As shown in FIG. 10, MCH's 772 and 782 couple the processors to respective memories, namely a memory 732 and a memory 734, which may be portions of main memory locally attached to the respective processors.

First processor 770 and second processor 780 may be coupled to a chipset 790 via P-P interfaces 752 and 754, respectively. As shown in FIG. 10, chipset 790 includes P-P interfaces 794 and 798. Furthermore, chipset 790 includes an interface 792 to couple chipset 790 with a high performance graphics engine 738. In one embodiment, an Advanced Graphics Port (AGP) bus 739 may be used to couple graphics engine 738 to chipset 790. AGP bus 739 may conform to the *Accelerated Graphics Port Interface Specification, Revision* 2.0, published May 7, 1998, by Intel Corporation, Santa Clara, Calif. Alternately, a point-to-point interconnect 739 may couple these components.

In turn, chipset 790 may be coupled to a first bus 716 via an interface 796. In one embodiment, first bus 716 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 10, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard/mouse 722, communication devices 726 and a data storage unit 728 which may include code 730, in one embodiment. Further, an audio I/O 724 may be coupled to second bus 720.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
an address generator to receive information corresponding to a vector memory instruction and to generate a plurality of addresses from the vector memory instruction, wherein the address generator is to permute the information into the plurality of addresses, wherein the plurality of addresses provide first conflict-free access to a plurality of partitions of a memory and second conflict-free access to a plurality of clusters of a register file, the address generator including a global unit coupled to a plurality of independent address generators, each associated with a different bank of the memory, wherein the global unit is to broadcast to the plurality of independent address generators a factorized stride based on stride information, a first factor, and a second factor that describes a distance between a pair of elements associated with a pair of addresses located in the same memory bank and consecutive line positions, and responsive to the broadcast, the plurality of independent address generators are to each output an address for the associated memory bank, a valid indicator, and an index to identify ordering of the elements in an output vector; and
a dynamic random access memory (DRAM) coupled to the address generator.

2. The system of claim 1, wherein the plurality of addresses is to be crossbar-free coupled to the memory.

3. The system of claim 2, wherein the plurality of independent address generators is to receive permuted information from the global unit and to generate the plurality of addresses therefrom.

4. The system of claim 3, wherein the address generator is to generate the plurality of addresses in a slice having a sequential order to sequentially access the plurality of partitions of the memory.

5. The system of claim 1, wherein the vector memory instruction is to provide a user guarantee of out-of-order execution of the vector memory instruction relative to prior instructions.

6. An apparatus comprising:
a register file to store vector data;
an address generator coupled to the register file to generate addresses for a vector memory operation;
a buffer coupled to the address generator to store the addresses in a plurality of input slices, wherein each of the plurality of input slices includes a plurality of segments each having one of the addresses and a status indicator to indicate a non-valid address or an already processed address, wherein each of the plurality of segments corresponds to one separately addressable bank of a memory;
a refilling latch to temporally combine addresses from at least some input slices and to store a plurality of addresses of an output slice; and
a controller to generate an output slice from at least some of the plurality of input slices in the refilling latch, the output slice including the plurality of addresses each corresponding to a separately addressable bank of the memory so that the output slice is conflict free.

7. The apparatus of claim 6, wherein the buffer includes the refilling latch, the refilling latch having a plurality of refilling segments, wherein each refilling segment corresponds to one of the plurality of segments of the input slices.

8. The apparatus of claim 7, wherein the controller is to insert addresses into the refilling latch such that an oldest one of the addresses in a first one of the plurality of segments of the plurality of input slices is stored in a first refilling segment of the refilling latch and an oldest one of the addresses in a second one of the plurality of segments of the plurality of input slices is stored in a second refilling segment of the refilling latch.

9. The apparatus of claim 7, wherein the controller is to read the latch in a sequential order that varies by cycle.

10. The apparatus of claim 7, wherein valid addresses in the refilling latch are to be sent to the memory in a single cycle.

11. The apparatus of claim 10, further comprising an interconnection network coupled to the controller to route the valid addresses to the memory.

12. The apparatus of claim 6, wherein the controller is to combine addresses for at least two of the plurality of input slices into the output slice.

13. The apparatus of claim 6, wherein the controller is to generate the output slice with multiple addresses corresponding to a separately addressable bank of the memory if the multiple addresses correspond to a single memory line within the separately addressable bank of the memory.

14. The apparatus of claim 6, further comprising a decompressor coupled to the memory to extract a portion of data of a memory location output from the memory corresponding to a gather operation.

15. The apparatus of claim 14, wherein the controller is to send a message to the decompressor to indicate the location of the extracted portion from a cache line corresponding to the gather operation.

16. The apparatus of claim 6, further comprising a bypass interconnect to bypass the controller and to route the addresses in the plurality of input slices to the memory, wherein the vector memory operation is indicative of conflict-free access to the memory.

17. The apparatus of claim 6, wherein the address generator comprises a plurality of units each associated with a separately addressable bank of the memory.

18. The apparatus of claim 6, wherein the vector memory operation corresponds to a user-level instruction, wherein the user-level instruction is to indicate that the addresses are conflict free.

19. A method comprising:
  receiving a user-level instruction to perform a memory operation on a plurality of vector elements, wherein the user-level instruction indicates that the memory operation is conflict free by providing a user guarantee that addresses of the plurality of vector elements are conflict free; and
  bypassing at least a portion of conflict analysis by a conflict detection logic responsive to the user-level instruction and performing the memory operation, wherein the conflict detection logic is not bypassed for an instruction without the indication and hardware is to verify the user guarantee as accurate to avoid inaccurate operation due to an improper user guarantee.

20. The method of claim 19, wherein the user-level instruction indicates that no conflicts exist between the memory operation and prior memory operations, and performing the memory operation ahead of at least one of the prior memory operations.

21. The method of claim 20, further comprising performing the memory operation without checking for conflicts between the plurality of vector elements and the prior memory operations.

22. The method of claim 19, further comprising:
  generating a plurality of addresses corresponding to the plurality of vector elements; and
  accessing a plurality of memory banks with the plurality of addresses, each of the plurality of addresses corresponding to one of the plurality of memory banks.

23. The method of claim 22, further comprising generating a slice from the plurality of addresses, the slice including a subset of the plurality of addresses, wherein each of the subset corresponds to a different one of the plurality of memory banks.

24. The method of claim 22, further comprising sending the plurality of addresses to the plurality of memory banks, bypassing the conflict detection logic.

25. An article comprising a machine-readable storage medium including instructions that if executed by a machine enable the machine to perform a method comprising:
  receiving a user-level instruction to perform a memory operation on a plurality of vector elements, wherein the user-level instruction indicates that the plurality of vector elements access different portions of a memory by providing a user guarantee that addresses of the plurality of vector elements are conflict free; and
  sending the memory operation to the different portions of the memory without checking for conflicts in the plurality of vector elements in a conflict detection logic, and verifying the user guarantee as accurate to avoid inaccurate operation due to an improper user guarantee.

26. The article of claim 25, wherein the method further comprises:
  generating a plurality of addresses corresponding to the plurality of vector elements; and
  accessing the different portions of the memory with the plurality of addresses, each of the plurality of addresses corresponding to one of the different portions of the memory.

27. The article of claim 26, wherein the method further comprises transmitting data accessed in the different portions of the memory directly to corresponding different portions of a register file.

28. The method of claim 19, wherein the hardware is to accept the user guarantee and bypass all of the conflict analysis.

* * * * *

UNITED STATES PATENT AND TRADEMARK OFFICE
CERTIFICATE OF CORRECTION

PATENT NO. : 7,627,735 B2  
APPLICATION NO. : 11/255676  
DATED : December 1, 2009  
INVENTOR(S) : Espasa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Twenty-first Day of December, 2010

David J. Kappos  
*Director of the United States Patent and Trademark Office*